United States Patent [19]

Sigai et al.

[11] Patent Number: 5,105,121

[45] Date of Patent: Apr. 14, 1992

[54] LANTHANUM CERIUM ALUMINATE PHOSPHOR AND AN ELECTRICAL DISCHARGE DEVICE CONTAINING THE SAME

[75] Inventors: Gary A. Sigai; Michael N. Alexander, both of Lexington; Charles W. Struck, Medfield, all of Mass.

[73] Assignee: GTE Laboratories Incorporated, Waltham, Mass.

[21] Appl. No.: 398,317

[22] Filed: Aug. 23, 1989

Related U.S. Application Data

[63] Continuation-in-part of Ser. No. 312,326, Feb. 16, 1989, abandoned, which is a continuation of Ser. No. 560,296, Dec. 12, 1983, abandoned.

[51] Int. Cl.$^5$ ............................................. C09K 11/80
[52] U.S. Cl. ............................. 313/486; 252/301.4 R
[58] Field of Search .................. 252/301.4 R; 313/486

[56] References Cited

U.S. PATENT DOCUMENTS

| | | | |
|---|---|---|---|
| 3,597,365 | 8/1971 | Ward | 252/301.4 R |
| 3,657,140 | 4/1972 | Gibbons et al. | 252/301.4 R |
| 3,922,233 | 11/1975 | Torii et al. | 252/301.4 R X |
| 4,088,922 | 5/1978 | Wolfe | 252/301.4 R X |
| 4,096,088 | 6/1978 | Ranby et al. | 252/301.4 R |
| 4,150,321 | 4/1979 | Schetters et al. | 252/301.4 R X |
| 4,153,572 | 5/1979 | Wolfe | 252/301.4 R |
| 4,216,408 | 8/1980 | Verstegen et al. | 252/301.4 R X |
| 4,246,630 | 1/1981 | Wolfe | 313/486 X |
| 4,249,108 | 2/1981 | Wolfe | 252/301.4 R X |
| 4,382,207 | 5/1983 | Verstegen et al. | 252/301.4 R X |

FOREIGN PATENT DOCUMENTS 49-123992 11/1974 Japan ............................ 252/301.4 R

OTHER PUBLICATIONS

Alexander et al., "J. Electrochem Soc.", 129, 127c (1982).
Dexpert et al., "J. Solid State Chem.", 19, pp. 193–204, 1976.
Rupp et al., "J. American Ceramic Soc.", 61, pp. 473–475 (1978).
Rupp et al., "J. American Ceramic Soc.", 63, pp. 416–419 (1980).
Sommerdijk et al., "Philips Technical Review", 37, pp. 221–223 (1977).
Stevels et al., "J. Luminescence", 14, pp. 147–152 (1976).
Stevels, "J. Electrochem. Soc.", 125, pp. 588–594 (1978).
Butler, "Fluorescent Lamp Phosphors-Technology and Theory", p. 270, (Penn State University Press), 1980.

Primary Examiner—Jack Cooper
Attorney, Agent, or Firm—Frances P. Craig

[57] ABSTRACT

Lanthanum cerium aluminate phosphor compositions are disclosed wherein the formula for the phosphor can be characterized as follows:

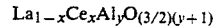

$$La_{1-x}Ce_xAl_yO_{(3/2)(y+1)}$$

wherein $0 < x < 1$ and $11 \leq y \leq 13.8$.

5 Claims, 4 Drawing Sheets

LANTHANUM CERIUM ALUMINATE PHOSPHOR AND AN ELECTRICAL DISCHARGE DEVICE CONTAINING THE SAME

This is a continuation-in-part of copending application Ser. No. 07/312,326 filed on Feb. 16, 1989, abandoned which is a continuation of application Ser. No. 06/560,296 filed on Dec. 12, 1983, abandoned.

FIELD OF THE INVENTION

This invention relates to phosphor compositions. More particularly, it relates to lanthanum cerium aluminate phosphor compositions, a process for making the phosphor compositions, a lamp provided with the phosphor compositions, and a phosphor blend incorporating the phosphor compositions.

BACKGROUND OF THE INVENTION

Sommerdijk and Stevels in an article entitled "The Behavior of Phosphors, with Aluminate Host Lattices," Philips Technical Review, volume 37, 221-233 (1977), discuss lanthanum aluminates and cerium aluminates. The article reports the existence region for the cerium aluminates and lanthanum aluminates with the formulae $(La_{0.86}O_{0.14})Al_{11.9}O_{19}$ and $(Ce_{0.86}O_{0.14})Al_{11.9}O_{19}$, respectively, as being "fairly narrow". The article further includes a discussion of a series of compositions represented by the formula $(La_{1-x}Ce_x)_{0.86}Al_{11.9}O_{19.14}$.

In a later article entitled "$Ce^{3+}$ Luminescence in Hexagonal Aluminates Containing Large Divalent or Trivalent Cations," J. Electrochem Soc. 125, 588-594 (1978), Stevels discusses the luminescent properties of the $(La_{1-x}Ce_x)0.86Al_{11.90}O_{19.14}$ series. The luminescence spectra of the compositions are reported to display two bands: one having a maximum in 330-350 nm region and the other with a maximum in the 410-430 nm region.

SUMMARY OF THE INVENTION

In accordance with one aspect of the invention, there is provided a luminescent phosphor composition consisting essentially of lanthanum cerium aluminate phosphors represented by the formula
P0378 12/14/83 560296 07-2344 2 101 300.00CH P0379 12/14/83 560296 07-2344 2 102 60.00CH P0380 12/14/83 560296 07-2344 2 103 10.00CH $$La_{1-x}Ce_xAl_yO_{(3/2)(y+1)}$$

wherein $0 < x < 1$ and $11 \, 23 \, y \, 23 \, 13.8$.

In another aspect of the invention, a process for preparing lanthanum cerium aluminate luminescent phosphor compositions comprises blending lanthanum (III) oxide, cerium (IV) oxide, and aluminum hydroxide together in the desired ratios to form a relatively uniform admixture, and then firing the admixture in a reducing atmosphere at an elevated temperature.

In accordance with a further aspect of the invention, a method for preparing lanthanum cerium aluminate luminescent phosphor compositions comprises co-precipitating lanthanum and cerium from solution as either oxalates or carbonates in the presence of aluminum oxide to form a precipitate containing lanthanum, cerium, and aluminum in the desired ratios; heating the precipitate; and firing the heated precipitate in a reducing atmosphere at an elevated temperature.

In another aspect of the invention, there is provided a fluorescent lamp having a coating of the above-described lanthanum cerium aluminate phosphor composition on the inner surface of the envelope.

In a further aspect of the invention, there is provided a white emitting phosphor blend containing a blue-emitting phosphor wherein the blue emitting phosphor is the phosphor composition of this invention.

For a better understanding of the present invention together with other and further objects, advantages, and capabilities thereof, reference is made to the following disclosure and appended claims in connection with the above described drawings.

DETAILED DESCRIPTION OF THE PREFERRED EMBODIMENT(S)

This invention relates to a luminescent phosphor composition consisting essentially of lanthanum cerium aluminate phosphors represented by the formula

$$La_{1-x}Ce_xAl_yO_{(3/2)(y+1)}$$

wherein $0 < x < 1$ and $11 \leq y \leq 13.8$. These lanthanum cerium aluminate phosphors possess a structure similar to the $\beta$-alumina and magnetoplumbite structures. The range of y, $11 \leq y \leq 13.8$, is that of a luminescent magnetoplumbite/$\beta^2$-alumina single phase solid solution. These compositions are further characterized by "ultraviolet" emission peaking at about 300 to 370 nanometers and "blue" emission peaking at about 400 to 500 nanometers. The values of x and y further determine whether the emission from these materials under 254 nanometer excitation will be predominantly in the blue region of the spectrum or predominantly in the ultraviolet region of the spectrum. As used herein, "predominantly" means "having the greater integrated relative intensity". Compositions for which y has values less than 11 and greater than 13.8 also emit under 254 nanometer excitation in the blue and ultraviolet regions of the spectrum. However, these compositions do not fall within the bounds of the single phase solid solution region. In these compositions, one or more nonluminescent phases is produced in addition to the single luminescent phase compositions.

Figure 1:
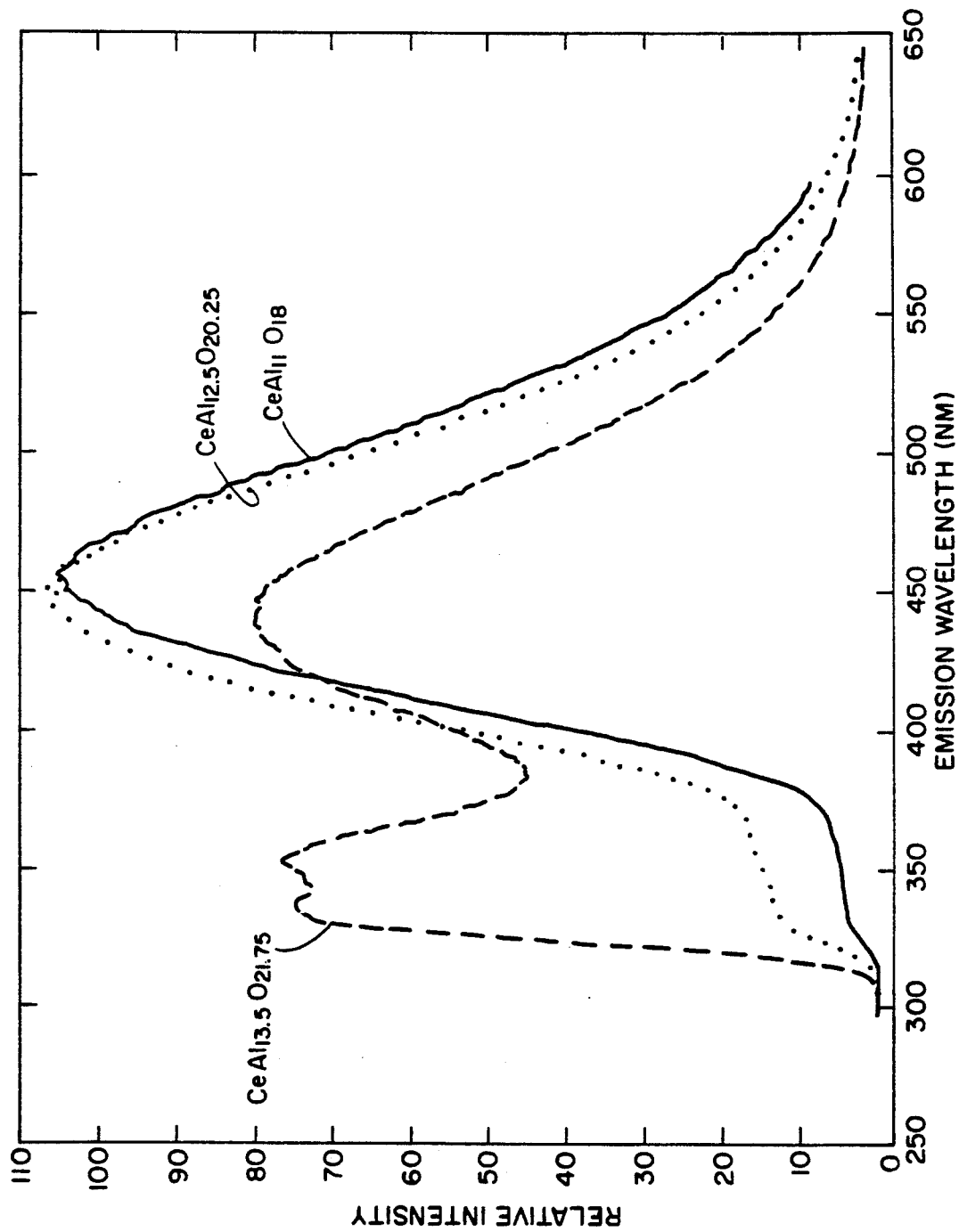
FIG. 1 illustrates the emission spectra of the known phosphor compositions $CeAl_{13.5}O_{21.75}$, $CeAl_{12.5}O_{20.25}$, and $CeAl_{11}O_{18}$.
Figure 2:
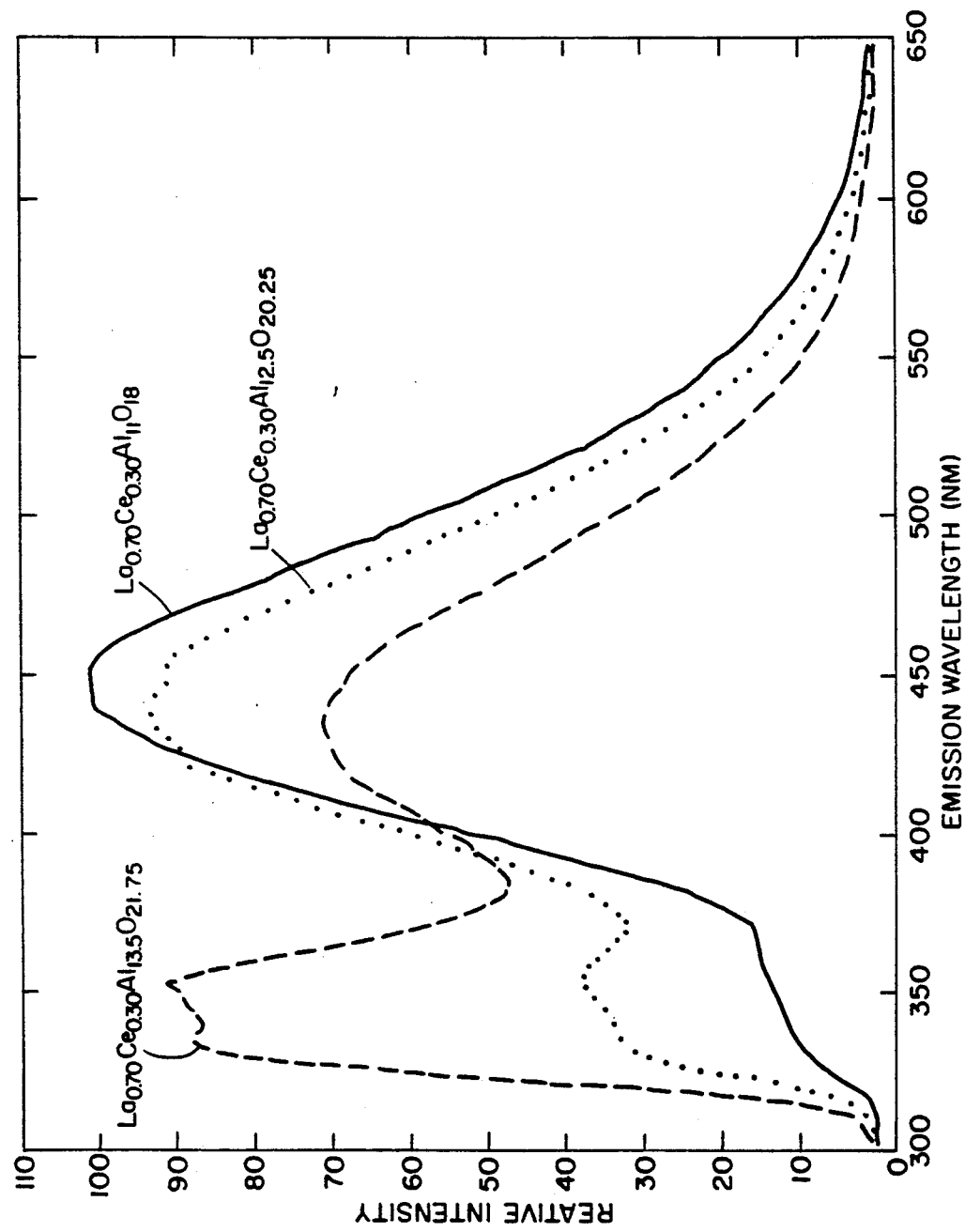
FIG. 2 illustrates the emission spectra of phosphor compositions of this invention represented by the formulae $La_{0.70}Ce_{0.30}Al_{13.5}O_{21.75}$, $La_{0.70}Ce_{0.30}Al_{12.5}O_{20.25}$, and $La_{0.70}Ce_{0.30}Al_{11}O_{18}$.
Figure 3:
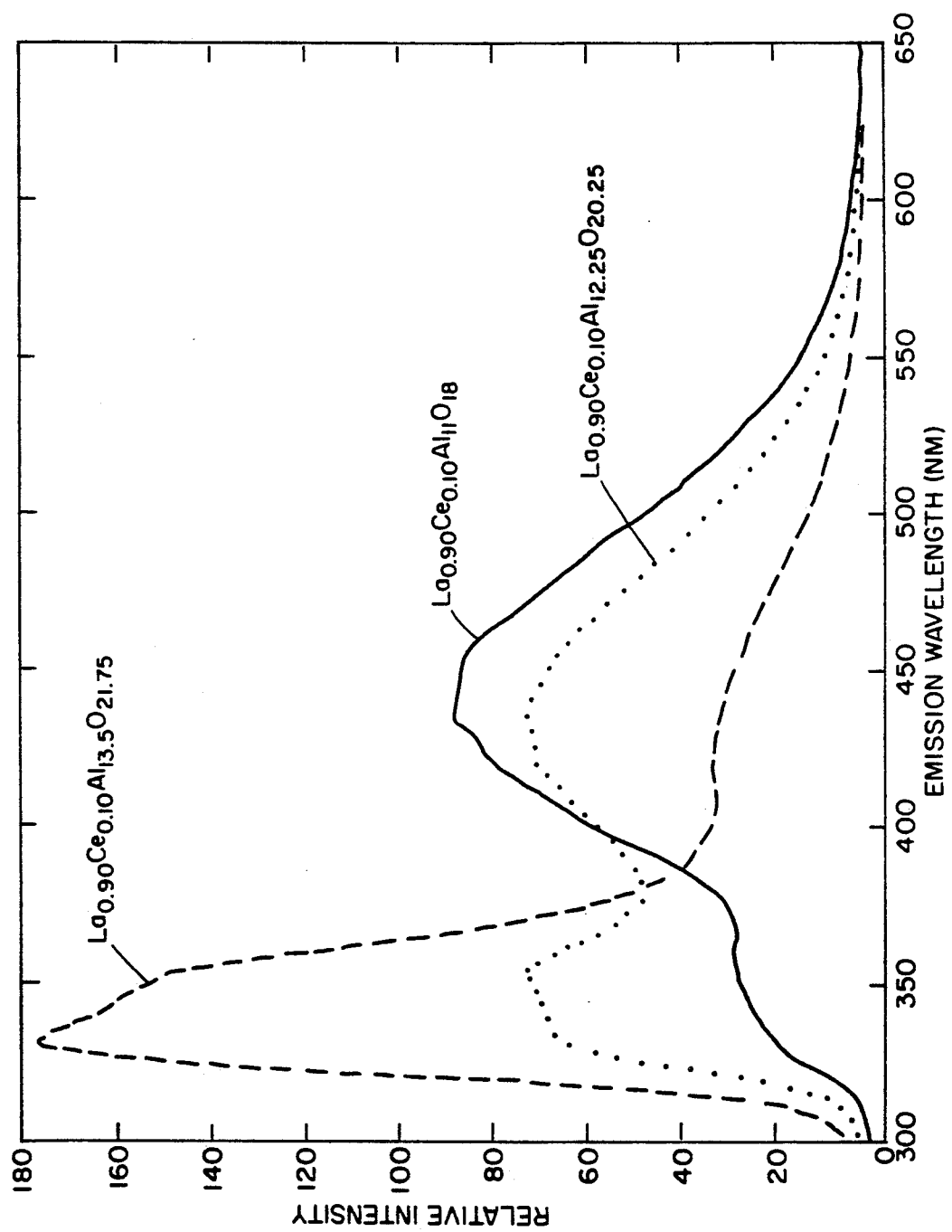
FIG. 3 illustrates the emission spectra of phosphor compositions of this invention represented by the formulae $La_{0.90}Ce_{0.10}Al_{13.5}O_{21.75}$, $La_{0.90}Ce_{0.10}Al_{12.5}O_{20.25}$, and $La_{0.90}Ce_{0.10}Al_{11}O_{18}$.
Figure 4:
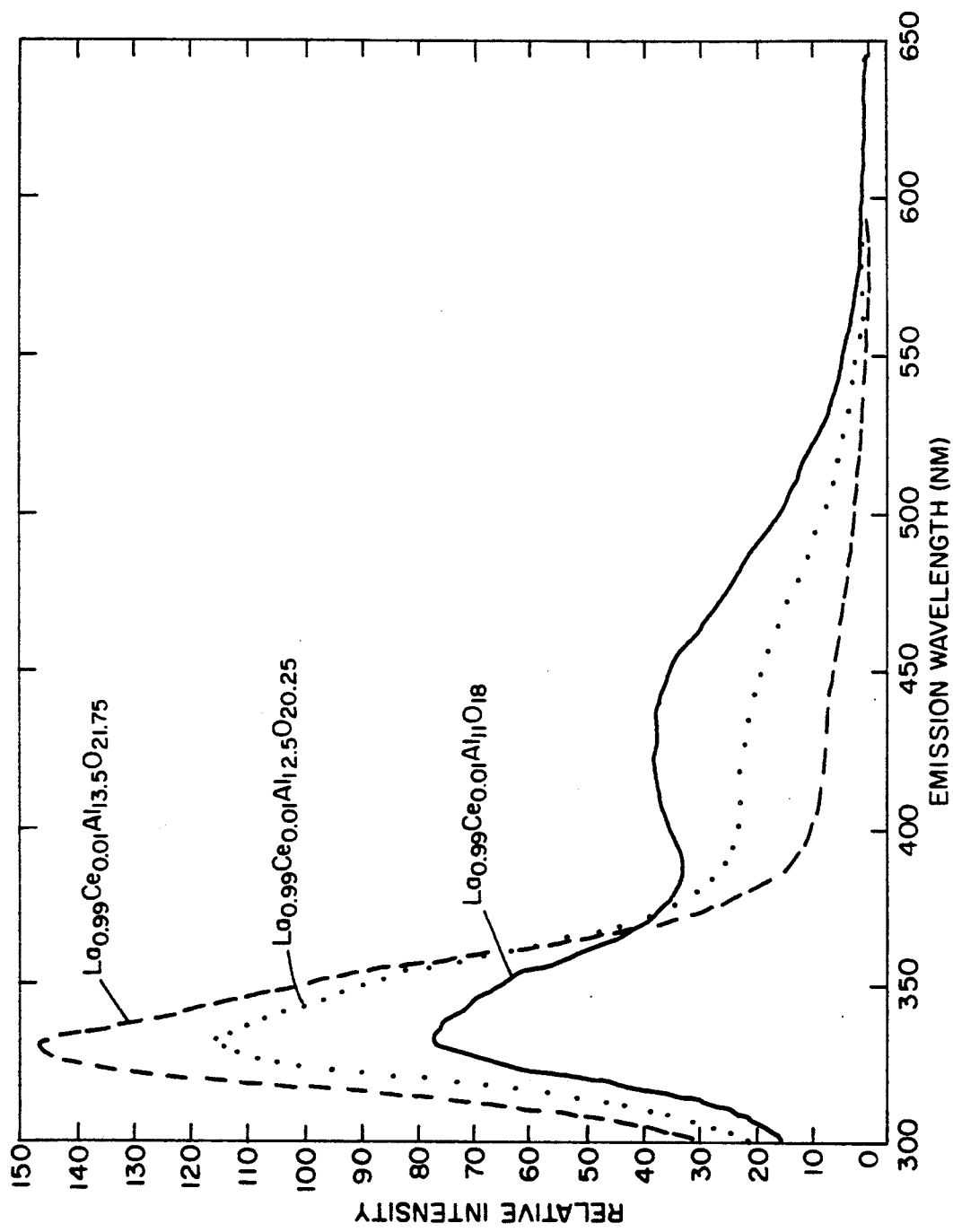
FIG. 4 illustrates the emission spectra of phosphor compositions of this invention represented by the formulae $La_{0.99}Ce_{0.01}Al_{13.5}O_{21.75}$, $La_{0.99}Ce_{0.01}Al_{12.5}O_{20.25}$, and $La_{0.99}Ce_{0.01}Al_{11}O_{18}$.

FIG. 1 shows emission spectra at room temperature for cerium aluminate compositions under 254 nanometer excitation. For purposes of discussion, these cerium aluminate compositions will be represented by the formula $La_{1-x}Ce_xAl_yO_{(3/2)(y+1)}$ wherein $x = 1$. FIG. 1 which represents the spectra for compositions wherein $x = 1$ is included for purposes of comparison only as such cerium aluminate compositions are known. FIGS. 2 through 4 show emission spectra at room temperature for lanthanum cerium aluminate phosphor compositions of this invention under 254 nanometer excitation. FIGS. 1, 2, 3 and 4 display the spectra for the compositions $La_{1-x}Ce_xAl_yO_{(3/2)(y+1)}$ wherein $x = 1$, 0.3, 0.1, and 0.01, respectively. Each Figure shows spectra for a specified fixed value of x wherein individual curves are for $y = 13.5$, 12.5 and 11.0.

The spectra show that for compositions with a fixed cerium and lanthanum content the relative intensity of the ultraviolet band increases as the aluminum content is increased. Of the compositions whose emission spectra are depicted in FIGS. 1 through 4, the maximum ultraviolet relative intensity is exhibited by compositions wherein there are 13.5 atoms of aluminum per formula unit.

In comparing the spectra for composition sequences with a fixed aluminum content per formula unit, the relative intensity of the emissions in the ultraviolet region of the spectrum increases as the cerium content is decreased and the lanthanum content is correspondingly increased. Conversely, the relative intensity of the blue band increases as cerium is substituted for lanthanum.

Table 1 summarizes the relative intensities (relative peak heights) of the ultraviolet emission band (300-370nm) and the blue emission band (400-500nm) for various compositions of the present invention wherein the aluminum content is 13.5 atoms of aluminum per formula unit. In Table I, the greatest spectral intensity in the range 300-500 nm is defined to be 100% for each composition. Table I does not compare absolute intensities between compositions.

TABLE I

| NORMALIZED PEAK HEIGHTS FOR INDIVIDUAL LANTHANUM CERIUM ALUMINATE COMPOSITIONS | | |
|---|---|---|
| COMPOSITION | 300-370 nm | 400-500 nm |
| $La_{0.99}Ce_{0.01}Al_{13.5}O_{21.75}$ | 100% | 5% |
| $La_{0.95}Ce_{0.05}Al_{13.5}O_{21.75}$ | 100% | 10% |
| $La_{0.90}Ce_{0.10}Al_{13.5}O_{21.75}$ | 100% | 20% |
| $La_{0.70}Ce_{0.30}Al_{13.5}O_{21.75}$ | 100% | 80% |
| $La_{0.50}Ce_{0.50}Al_{13.5}O_{21.75}$ | 85% | 100% |
| $La_{0.30}Ce_{0.70}Al_{13.5}O_{21.75}$ | 100% | 85% |
| $CeAl_{13.5}O_{21.75}$ | 92% | 100% |

Ultraviolet emissions ranging from significant to predominant are observed for the compositions listed in Table 1. It is further noted that the relative intensity, as defined above, of the ultraviolet band is unaffected by the appearance of the blue band as the cerium content is increased, ranging from 85% to 100%. Moreover, the quantum efficiency, based on integrated intensity and absorption remains essentially constant, changing only a few percent over the range of phosphor compositions in this invention.

The lanthanum cerium aluminate luminescent compositions of this invention represented by the formula

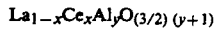

wherein $0 < x \leq 0.10$ and $13 \leq y \leq 13.8$ have application as ultraviolet emitting phosphors. These compositions are characterized by predominantly ultraviolet peak emission. These predominantly ultraviolet emitting compositions are suitable for use in uv-emitting fluorescent lamps.

The lanthanum cerium aluminate phosphor compositions of this invention represented by the formula

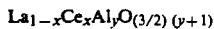

wherein $0.10 < x < 1.0$ and $11 \leq y \leq 12.5$, and preferably $0.10 x < 1.0$ and $11 \leq y \leq 12$, have application as blue-emitting phosphors. These compositions are characterized by predominantly blue peak emission. Application for these predominantly blue-emitting compositions includes, use as the blue emitting phosphor in a white-emitting phosphor blend containing a blue-emitting phosphor for use in fluorescent lamp of high color rendering index.

A process for preparing the luminescent phosphor composition of this invention consisting essentially of lanthanum cerium aluminate phosphors represented by the formula $La_{1-x}Ce_xAl_yO_{(3/2)(y+1)}$ wherein $0 < x < 1.0$ and $11.0 \leq y \leq 13.8$ comprises the sequential steps of blending lanthanum (III) oxide, a cerium (IV) oxide, and aluminum hydroxide, together in the desired ratios to form a relatively uniform admixture; precalcining the admixture in air at a temperature of about 850° C. for about one hour; firing the product of the precalcining step in a reducing atmosphere at an elevated temperature for about 3 to about 4 hours; pulverizing the product of the firing step; firing the product of the pulverizing step in a reducing atmosphere at an elevated temperature and pulverizing the product of the second firing step. The process may further include the steps of firing the product of the second pulverizing step in a reducing atmosphere at an elevated temperature to form a fired material and pulverizing the fired material. Examples of a suitable reducing atmosphere for use in the above process for the preparation of the lanthanum cerium aluminate phosphors compositions of this invention include hydrogen gas or a mixture of gases consisting of at least 5 volume percent hydrogen with the balance consisting of an inert gas such as nitrogen or argon. The reducing atmosphere can be wet or dry.

The firing steps can be carried out at temperatures from about 1600° to about 1800° C. The preferred firing temperature to be used in the above set forth process is from about 1750° to about 1775° C., the more preferred firing temperature being about 1750° C.

Another method for preparing the lanthanum cerium aluminate luminescent phosphor composition of this invention involves forming a precipitate containing lanthanum, cerium, and aluminum in the desired ratios, heating the precipitate to the corresponding oxide and converting the oxide to the luminescent phosphor composition of this invention by firing the oxide in a reducing atmosphere at an elevated temperature. Precipitation agents that can be used in this method include oxalic acid or ammonium carbonate. The precipitation method employing an oxalic acid precipitation agent comprises the sequential steps of dissolving lanthanum (III) oxide, and cerium (III) nitrate hexahydrate in predetermined proportions as desired in said phosphor composition in hot acid and diluting the solution with water. The diluted solution is next heated to a temperature of about 90° C. Gamma-aluminum oxide, in a predetermined proportion as desired in said phosphor composition, is carefully added to the 90° C. solution. Solid oxalic acid is next added to the heated solution, with stirring, in amounts at least sufficient to fully precipitate the lanthanum and cerium ions. The solution is allowed to cool to ambient temperature and let stand undisturbed for a period of time sufficient for the precipitation reaction to occur. The precipitate is collected, dried at a temperature of about 140° C., cooled to ambient temperature and pulverized. The pulverized material is next fired in a reducing atmosphere at a temperature of from about 1600° to about 1800° C. for about 3 to about 4 hours, cooled to ambient temperature, and pulverized.

Examples of a suitable reducing atmosphere for use in the firing step include hydrogen or a mixture of gases consisting of at least 5 volume percent hydrogen with the balance consisting of an inert gas, such as nitrogen or argon. This method may optionally include additional firing and pulverizing steps.

The precipitation method employing an ammonium carbonate precipitation agent comprises the sequential steps of dissolving lanthanum (III) oxide and cerium (III) nitrate hexahydrate in predetermined proportions as desired in said phosphor composition in hot acid; diluting the solution with water; adding $\gamma$-aluminum oxide, in a predetermined proportion as desired in said phosphor composition, to the solution; neutralizing the solution with ammonium carbonate; adding a small amount of carbonate in excess of the amount needed to neutralize the solution; stirring the solution; allowing the solution to stand undisturbed for a period of time sufficient for the precipitation reaction to occur; collecting the precipitate; drying the precipitate at a temperature of about 140° C.; and pulverizing the precipitate. The pulverized precipitate is next fired in reducing atmosphere at a temperature of from about 1600° to about 1800° C. for about 3 to about 4 hours, cooled to ambient temperature and pulverized.

Examples of a suitable reducing atmosphere for use in the firing step include hydrogen or a mixture of gases consisting of at least 5 volume percent hydrogen with the balance consisting of an inert gas such as nitrogen or argon. This method may further include additional firing and pulverizing steps.

The fluorescent lamps of the present invention can have the structure as shown, for example, in U.S. Pat. Nos. 2,151,496; 3,424,605; 3,424,606; or 3,435,271; the figures of which, and the portions of the specification corresponding thereto, are incorporated herein by reference to the extent necessary to complete this specification. Such fluorescent lamps consist of a hermetically sealed tubular glass envelope coated on its inside surface with a powdered phosphor coating comprising the luminescent phosphor composition of this invention. The bases at each end of the tubular envelope support electrical leads which are electrically connected to electrodes at each end of the lamp. The spaced electrodes can be coated with electron-emission promoting materials, such as mixtures of oxides containing a barium oxide, to facilitate operation of the lamp. During operation, a mercury droplet maintained within the sealed envelope is vaporized thereby causing the characteristic mercury discharge. Except for the nature of the phosphor coating, which is the subject of the present invention, construction of the lamp is conventional.

An important feature of the phosphor composition of this invention is its resistance to degradation during the lehring (air baking) step of lamp fabrication. As shown in Table II, cerium aluminate undergoes approximately a 23% reduction in emission during a five-minute air bake at 600° C., whereas for lanthanum cerium aluminate the degradation is less. The degradation decreases monotonically with increasing lanthanum content and with decreasing exposure to air bake.

TABLE II

| | DEPENDENCE OF EMISSION DEGRADATION ON LANTHANUM SUBSTITUTION IN $La_{1-x}Ce_xAl_{11}O_{18}$ FOR AIR BAKING AT 600° C. | |
|---|---|---|
| x | Percent Emission Intensity Remaining After 5 min. Air Bake | Percent Emission Intensity Remaining After 1 hr. Air Bake |
| 1.0 | 77 | 24 |
| 0.5 | 85 | 30 |
| 0.10 | 95 | 66 |
| 0.01 | 98 | 66 |

Lamp tests carried out on $La_{0.80}Ce_{0.20}Al_{11}O_{18}$ and $CeAl_{11}O_{18}$ confirmed the superior resistance of the lanthanum cerium aluminate phosphor composition to process degradation.

The efficiency of these phosphor compositions was assessed by comparing them to (Ba,Mg) aluminate: $Eu^{2+}$, which is a well-known efficient blue emitting phosphor. The integrated intensity of $La_{0.8}Ce_{0.2}Al_{11}O_{18}$ was found to be virtually identical to that of the (Ba,Mg) aluminate: $Eu^{2+}$. Further, it was found that the quantum efficiency varied little as a function of x and y for $La_{1-x}Ce_xAl_yO_{3/2(y+1)}$ in the range $0<x<1.0$, $11.0 \leq y \leq 13.5$.

The following Examples are given to enable those skilled in this art to more clearly understand and practice the present invention. They should not be considered as a limitation upon the scope of the invention but merely as being illustrative and representative thereof.

EXAMPLE I

A blended mixture was made of
1,1859 g $CeO_2$
4,7678 g $La_2O_3$
29.558 g $Al(OH)_3$--;

The mixture was precalcined in a 50 cc crucible at a temperature of about 850° C. for about one hour in air. After cooling, the precalcined mixture was fired for 4 hours at a temperature of about 1750° C. in dry hydrogen. After cooling and pulverizing, the fired mixture was fired a second time for four hours at a temperature of about 1750° C. in dry hydrogen. The twice fired mixture was cooled and pulverized and fired a third time for 4 hours at a temperature of about 1750° C. in dry hydrogen. After cooling and pulverizing, a material was obtained having a composition represented by the formula

$La_{0.80}Ce_{0.20}Al_{11.0}O_{18.0}.$

EXAMPLE II 0.8189 g lanthanum (III) oxide was dissolved in 15ml hot 1:1 nitric acid. 0.2376g cerium (III) nitrate hexahydrate was dissolved in the hot lanthanum (III) oxide solution. The solution containing the lanthanum (III) oxide and cerium (III) nitrate hexahydrate was diluted to a total volume of 200 ml with distilled water. The diluted solution was heated to a temperature of about 90° C. 3.1861g -aluminum oxide was added to the about 90° C. solution with stirring to form a suspension. About 4g solid oxalic acid was also added to the about 90° C. solution. The solution was stirred for 15 minutes; cooled to ambient temperature; and allowed to stand for a period of time sufficient for the precipitation reaction to occur (about 4 hours). The resulting mixture was stirred and filtered. The precipitate was transferred to a beaker and dried at a temperature of about 140° C. The dried precipitate was then crushed and sieved through 100 mesh. The sieved precipitate was fired in an alumina crucible in wet forming gas (5%$H_2$/95%$N_2$) at a temperature of 1775° C. for three hours. The fired material was allowed to cool to ambient temperature and was pulverized. The material obtained is represented by the formula $$La_{0.90}Ce_{0.10}Al_{11}O_{18}.$$

EXAMPLE III 0.8189g lanthanum (III) oxide was dissolved in 10 ml of hot 1:1 nitric acid. 0.2376g cerium (III) nitrate hexahydrate was dissolved in the hot lanthanum (III) oxide solution. The solution containing the dissolved lanthanum (III) oxide and cerium (III) nitrate hexahydrate was diluted to a total volume of 150 ml with distilled water. 3.1861g γ-aluminum oxide was added to the diluted solution with stirring to form a suspension. Ammonium carbonate was added until the solution was slightly basic. The solution was stirred for 10 to 15 minutes. The solution was allowed to stand for a period of time sufficient for the precipitation reaction to occur (about 16 hours). The resulting mixture was stirred and filtered. The precipitate was transferred to a beaker and dried at a temperature of about 140° C. for 3 hours. The dried precipitate was crushed to a fine powder in a mortar and pestle. The crushed precipitate was fired in an alumina crucible in wet forming gas (5%$H_2$/95%$N_2$) at a temperature of 1775° C. for 3 hours. The fired material was allowed to cool to ambient temperature and was pulverized. The material obtained is represented by the formula $$La_{0.90}Ce_{0.10}Al_{11}O_{18}.$$

While there has been shown and described what is at present considered the preferred embodiments of the invention it will be obvious to those skilled in the art that various changes and modifications may be made therein without departing from the invention as defined by the appended claims.

What is claimed is:

1. A luminescent phosphor composition consisting essentially of lanthanum cerium aluminate phosphors represented by the formula $$La_{1-x}Ce_xAl_yO_{(3/2)(y+1)}$$

wherein $0.10 < x < 1$ and $11.0 \leq y \leq 12.5$ said lanthanum cerium aluminate phosphors existing as a magnetoplumbite/-beta-alumina single phase material characterized by ultraviolet peak emission and blue peak emission with relative intensities of the ultraviolet peak emission and the blue peak emission being a function of x and y, and further characterized by predominantly blue peak emission.

2. A white emitting phosphor blend which contains a blue emitting phosphor wherein the blue emitting phosphor is the phosphor composition of claim 1.

3. The luminescent phosphor composition of claim 1 wherein $0.10 < x < 1.0$ and $11.0 \leq y \leq 12$.

4. A white emitting phosphor blend which contains a blue emitting phosphor wherein the blue emitting phosphor is the phosphor composition of claim 3.

5. An electrical discharge device comprising:
   a. a pair of electrodes;
   b. a glass envelope disposed about and sealed to said electrodes;
   c. a fill of mercury disposed within said envelope; and
   d. a coating of a luminescent phosphor composition, consisting essentially of lanthanum cerium aluminate phosphors represented by the formula:
   $$La_{1-x}Ce_xAl_yO_{(3/2)(y+1)}$$
   wherein $0.10 < x < 1.0$ and $11 \leq y \leq 12.5$, said lanthanum cerium aluminate phosphors existing as a magnetoplumbite/beta-alumina single phase material characterized by ultraviolet peak emission and blue peak emission with relative intensities of the ultraviolet peak emission and the blue peak emission being a function of x and y.

* * * * *